(12) United States Patent
Rahn

(10) Patent No.: US 7,170,041 B2
(45) Date of Patent: Jan. 30, 2007

(54) PIXEL CIRCUITRY FOR IMAGING SYSTEM

(75) Inventor: Jeffrey Rahn, Mt. View, CA (US)

(73) Assignee: Xerox Corporation, Stamford, CT (US)

( * ) Notice: Subject to any disclaimer, the term of this patent is extended or adjusted under 35 U.S.C. 154(b) by 150 days.

(21) Appl. No.: 10/064,471

(22) Filed: Jul. 17, 2002

(65) Prior Publication Data

US 2004/0013232 A1    Jan. 22, 2004

(51) Int. Cl.
*H01L 27/00* (2006.01)
*H05G 1/64* (2006.01)
*G01T 1/24* (2006.01)

(52) U.S. Cl. ............. 250/208.1; 378/98.8; 250/370.09; 348/308

(58) Field of Classification Search ................. 378/19, 378/98.8; 250/208.1, 332, 370.08, 370.09; 327/91, 94, 424; 348/307, 308, 309, 310
See application file for complete search history.

(56) References Cited

U.S. PATENT DOCUMENTS

| | | | | |
|---|---|---|---|---|
| 4,684,812 A | * | 8/1987 | Tew et al. | 348/164 |
| 4,823,027 A | * | 4/1989 | Takahashi | 327/94 |
| 4,905,265 A | * | 2/1990 | Cox et al. | 378/98.8 |
| 5,629,524 A | * | 5/1997 | Stettner et al. | 250/370.09 |
| 5,742,047 A | * | 4/1998 | Buhler et al. | 250/214 R |
| 5,751,005 A | * | 5/1998 | Wyles et al. | 250/370.06 |
| 5,811,808 A | * | 9/1998 | Cannata et al. | 250/332 |
| 5,841,126 A | * | 11/1998 | Fossum et al. | 250/208.1 |
| 5,844,682 A | * | 12/1998 | Kiyomoto et al. | 356/237.1 |
| 5,872,470 A | * | 2/1999 | Mallinson et al. | 327/94 |
| 5,887,049 A | * | 3/1999 | Fossum | 378/98.8 |
| 5,901,257 A | * | 5/1999 | Chen et al. | 382/312 |
| 6,040,568 A | * | 3/2000 | Caulfield et al. | 250/208.1 |
| 6,317,154 B2 | * | 11/2001 | Beiley | 348/308 |
| 6,429,413 B1 | * | 8/2002 | Kawahara et al. | 250/208.1 |
| 6,518,558 B1 | * | 2/2003 | Bohm et al. | 250/208.1 |
| 6,606,120 B1 | * | 8/2003 | Merrill et al. | 348/273 |
| 6,885,002 B1 | * | 4/2005 | Finch et al. | 250/332 |
| 7,098,952 B2 | * | 8/2006 | Morris et al. | 348/308 |
| 2003/0015645 A1 | * | 1/2003 | Brickell et al. | 250/208.1 |

OTHER PUBLICATIONS

Nicholas Tsoulfanidis. Measurement and Detection of Radiation, second edition (Washington, DC: Taylor & Francis, 1995), p. 235-263.*
Amnon Yariv. Optical Electronics, third edition (New York, NY: Holt, Rinehart, and Winston, Inc., 1985), p. 367-376 and Fig. 11-15.*

* cited by examiner

*Primary Examiner*—Allen C. Ho
(74) *Attorney, Agent, or Firm*—Oliff & Berridge, PLC

(57) ABSTRACT

An imaging system can include at least a two-dimensional array of pixels, an input device that includes a sensor that provides an electronic signal that represents to the image two-dimensional array of pixels, and a controller, the electronic signal is controlled by a controller so that the electronic signal is either stored in the first capacitor, or stored in the second capacitor. The electronic signal can also be controlled by the controller so that the electronic signal is either stored in the first capacitor during a phase of one of the control signals, or not stored in the first capacitor during a phase of another one of the control signals. The system permits a dynamic response time for properly managing frame times associated with a large number of pixels so that the images will not appear as blurry images when they are displayed.

4 Claims, 7 Drawing Sheets

PIXEL CIRCUITRY FOR IMAGING SYSTEM

This invention was made with United States Government support under Agreement No. 70NANB7H3007 awarded by NIST. The United States Government has certain rights in this invention.

BACKGROUND OF THE INVENTION

1. Field of Invention

The present invention relates to imaging systems and methods.

2. Description of Related Art

Currently, imaging systems are used in a wide variety of fields. For example, imaging systems are used extensively for medical applications in assisting a medical professional to determine the best treatment for a patient.

Recently, there has been success with large-area imaging systems and processes that are used as medical imaging systems. These large-area imaging system can use a large number of pixels where a frame time can be quite long, for example, the frame time can be nearly 1 second. One frame time is the time required for all of the pixels in the imaging system to be read out. Further, because these large-area imaging systems can combine a plurality of static images, changes to one static image that occur faster than an established frame time are averaged together which results in the large-area imaging system displaying blurry images. This problem can be caused by the inability of pixel circuitry used within the imaging system to permit a dynamic response time when an object that is moving is imaged by the imaging system.

Thus, there is a need for an imaging system with a pixel circuitry that permits a dynamic response time capable of properly managing the frame times associated with a large number of pixels so that the images will not appear as blurry images when they are displayed. There is an additional need for the ability to synchronize the imager response to external events such as a strobe light, x-ray source, or an object moving into an appropriate position for imaging.

SUMMARY OF THE INVENTION

The invention provides imaging systems that use a pixel circuitry to scan a rapidly changing image.

The invention further provides imaging systems that include a pixel circuitry that is used so that images can be taken of a dynamic signal with time scales much shorter than the time frame.

The invention separately provides imaging systems that include a pixel circuitry that provides a faster exposure rate, so that any movement which takes place during the exposure does not blur the image.

In various exemplary embodiments of the imaging systems according to the invention, an imaging system can include at least a two-dimensional array of pixels, an input device that includes a sensor that provides an electronic signal that represents to the image two-dimensional array of pixels, and a controller, the electronic signal is controlled by a controller so that the electronic signal is either stored in the first capacitor, or stored in the second capacitor.

In various exemplary alternative embodiments of the imaging systems according to the invention, the electronic signal can be controlled by the controller so that the electronic signal is either stored in the first capacitor during a phase of one of the control signals, or not stored in the first capacitor during a phase of another one of the control signals.

In various exemplary alternative embodiments of the imaging systems according to the invention, an imaging system can include at least a two-dimensional array of pixels, an input device that includes a sensor that provides an electronic signal that represents to the image two-dimensional array of pixels, and a controller that provides a first and second control signal, the electronic signal being controlled by the controller so that a charge from the electronic signal is either added to the at least one capacitor when a phase of the first control signal is high and a phase of the second control signal is low, or the electronic signal is subtracted from the at least one capacitor when a phase of the first control signal is low and the phase of the second control signal is high.

In various exemplary alternative embodiments of the imaging systems according to the invention, two complete pixel circuitries can both be connected to a same sensor. For example, two pixel layouts that include a capacitor plus a thin-film transistor can be both connected to the same sensor. During a determined time frame, the sensor current can be directed to either of the two capacitors by switching on either a first transistor $T_1$ or a second transistor $T_2$. Subsequently, both capacitors are read out by activating a gate line for that specific capacitor.

In various exemplary alternative embodiments of the imaging systems according to the invention, a switching process within the pixel circuitry occurs between two storage capacitors in order to improve the performance of imaging systems. For example, one capacitor could be independently active for a short period of time (greater than 10 microseconds) as compared to the other capacitor, allowing snapshot imaging of a rapidly changing source.

Furthermore, a lock-in technique or amplification method can be applied to enhance data and conditions where image backgrounds are large. In this method, a fixed frequency can be used so that the large number of pixels that are part of the pixel circuitry are activated at the same frequency. Subsequently, the difference between stored capacitor values is analyzed so that a rejection of fixed signals can be performed.

In various exemplary alternative embodiments of the imaging systems and methods according to the invention, a two-color imaging process can be performed using the pixel circuitry of the invention by illuminating the imaging system with strobe lights of different colors. Then, the image can be stored in the two different capacitors so that an object can be imaged in partial color while the object is moving.

In various exemplary alternative embodiments of the imaging systems according to the invention, a plurality of capacitors can be used with the pixel circuitry, for example, three or four capacitors, so that full color can be achieved with the imaging system. Moreover, an extra capacitor can be used for storing leakage current. Furthermore, a common ground, i.e., short to ground, can used in conjunction with one capacitor in the pixel circuitry to prevent leakage, i.e., a part of a DC component is coupled into other circuits along with an AC component.

In various exemplary alternative embodiments of the systems and methods according to the invention, a moving piece of paper can be imaged in full color with three strobe lights over a period of less than a hundred microseconds allowing the paper to keep moving while imaging system readout occurs.

In various exemplary alternative embodiments of the imaging systems according to the invention, a differential structure can be used as the pixel circuitry so that a charge from the sensor is either added to the storage capacitor through control signals $\phi_1$ and $\phi_2$ when the phase of the control signal $\phi_1$ is high and the phase of the control signal $\phi_2$ is low, or subtracted from the storage capacitor when the phase of the control signal $\phi_1$ is low and the phase of the control signal $\phi_2$ is high. Subsequently, a transistor $T_5$ can be switched on while the control signal $\phi_1$ is high and the control signal $\phi_2$ is low in order to read out the storage capacitor.

Additional functions, objects, advantages and features of the present invention will become apparent from consideration of the following description and drawings of exemplary embodiments.

BRIEF DESCRIPTION OF THE DRAWINGS

These and other features and advantages of this invention are described in, or are apparent from, the following detailed description of various exemplary embodiments of the systems and methods according to this invention, wherein like numerals reference like elements, and wherein.

DETAILED DESCRIPTION OF PREFERRED EMBODIMENTS

In typical imaging systems, pixel circuitry can be used as a layout of circuits so that the imaging system can control an electrical signal that represents an image of an object. For example, the pixel circuitry can be used to accumulate a signal from a sensor and allow that signal to be read out in a controlled manner. In general, the pixel circuitry equates to physical connections that are used by the imaging system to control the electric signal from the sensor.

Figure 1:
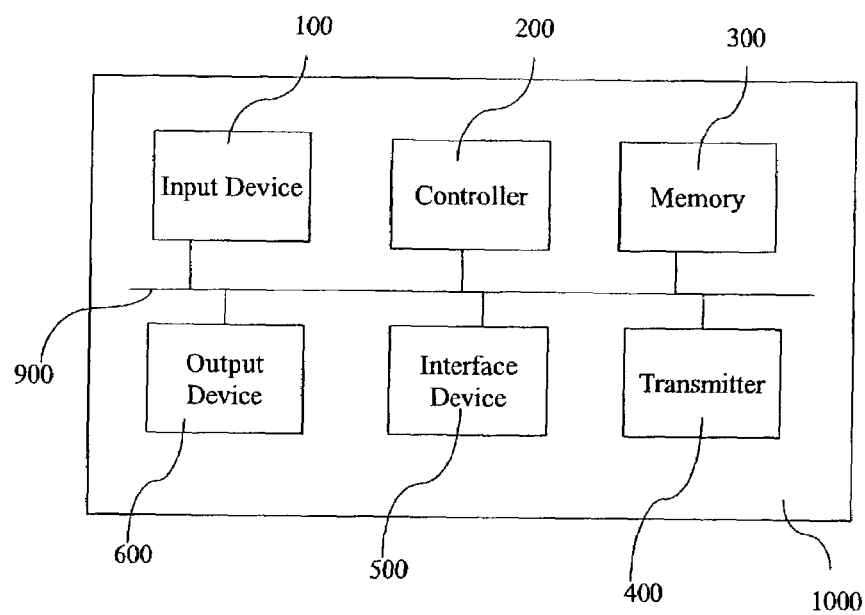
FIG. 1 is an exemplary block diagram of an imaging system.

FIG. 1 shows a block diagram of various components of an imaging system 1000 that includes various exemplary embodiments according to this invention. The imaging system 1000 can include components such as an input device 100, a controller 200, a memory 300, a transmitter 400, an interface device 500 and an output device 600. The components can be interconnected by a common bus 900.

The input device can be any device which allows an object to be input into the imaging system 1000 in order to be imaged. For example, a scanner can be used to scan an object to create an electronic image, whereby the resulting electronic image of the scanned object is input into the imaging system 1000. Moreover, the input device 100 used with an imaging system 1000 can be a device that permits a human body to be scanned as the object, an x-ray imaging system, whereby the electronic image of the scanned human body is input into the imaging system 1000.

The controller 200 controls each of the components of the imaging system 1000 so that an object can be imaged, processed and output through the output device 600. The controller 200 can be implemented with a general purpose processor. Furthermore, the controller 200 can be implemented using a single special purpose integrated circuit, e.g., ASIC, having a main or central processor section for overall, system-level control, and separate sections dedicated to performing various different specific computations, functions and other processes under control of the central processor sections. The controller 200 can be suitably programmed for use with a general purpose computer, e.g., a microprocessor, microcontroller or other processor device, CPU or NPU, either alone or in conjunction with one or more peripheral, e.g., integrated circuit, data and signal processing devices.

The memory 300 can be any device capable of storing data or information for the imaging system 1000.

The transmitter 400 can be either a single transmitter or a plurality of transmitters and any device that transmits, emits or irradiates a signal (or signals) towards the object to be imaged so that the input device 100 can form an image of the object. For example, the transmitter 400 can be a x-ray source that allows an x-ray image to be taken of a human body. Furthermore, the transmitter 400 can be a light source that allows an object to be scanned for imaging. The interface device 500 allows each component of the imaging system 1000 to communicate with each other so that the imaging system 1000 can function normally.

The output device 600 can be any device capable of receiving the electronic image of the object and producing an image of the object so the electronic image can be viewed. For example, the output device 600 can be a printer that prints an image of the scanned object. Furthermore, the output device 600 can be a display used to display an electronic image of the scanned object so that an operator can view the electronic image. The output device can be any other device that provides an image of the object that was input and scanned by the imaging system 1000.

Although these various components of the imaging system 1000 are discussed for example purposes only, it should be appreciated that the systems and methods according to this invention can be used with any components of imaging systems, and using more or less components, without departing from the spirit and scope of the invention. For example, the imaging system 1000 can be an x-ray imaging system configuration disclosed in U.S. Pat. No. 6,408,054 to Rahn et al., herein incorporated by reference in its entirety, for imaging objects that includes an x-ray emitter and an image contrast grid (antiscatter grid) placed between the x-ray emitter and image contrast grid. The x-ray emitter emits x-rays on an object to be imaged, i.e., the human body. The transmitted x-rays then strike a surface of a detector within the grid in order to form the image of the object.

Figure 2:
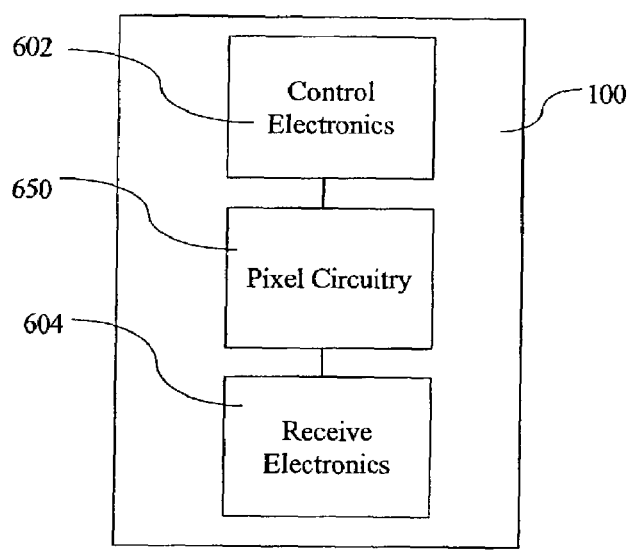
FIG. 2 is an exemplary detailed block diagram of a input device used in the imaging system in FIG. 1.

FIG. 2 shows a more detailed block diagram of an input device 100 that can be used in the imaging system 1000. The input device 100 can include control electronics 602, receive electronics 604, and many copies of the pixel circuitry 650. The control electronics 602 can include a plurality of power supplies, global control signals to all pixel circuits 650, and sequenced control signals to individual pixel circuits. The receive electronics 604 can include a plurality of amplifiers, analog filters, analog-to-digital filters, digital filters, and a high-speed data interface for sending either analog or digital information to memory 300 or the common bus 900.

The pixel circuit 650 of the input device can include a sensor such as an a—Si thin—film photodiode, a lead iodide or mercuric iodide photodetector, crystalline or polycrystalline silicon, or any other material which provides a current dependent on the illumination used in the system. Examples of such materials are described in J. Rahn et al., "High Resolution, High Fill Factor a-Si:H Sensor Arrays for Optical Imaging," Materials Research Society Proc. 557, April 1999, San Francisco, Calif.; and R. A. Street, "X-ray Imaging Using Lead Iodide as a Semiconductor Detector," Proc. SPIE 3659, Physics of Medical Imaging, February 1999, San Diego, Calif., each incorporated herein by reference in its entirety.

As previously discussed, the pixel circuitry 650 is the layout of the circuits which generate signals which represent image information and, under the direction of the control electronics 602, send those signals to the receive electronics 604. A typical imager has millions of pixels. Each pixel has a simple circuit to detect the image intensity at that point. The pixel circuitry 650 can be the physical connections of channels, conductors and equipment which are present at each pixel in the imager. The electric signal of the object image is generated by the pixel circuitry 650. It should be appreciated that for discussion purposes the pixel circuitry can be any network or configuration of circuit elements, such as wiring, resistors, inductors, capacitors, semiconductors, amplifiers, transistors, inverters, grounds and any known or later developed circuitry elements associated with pixels for imaging systems.

Figure 3:
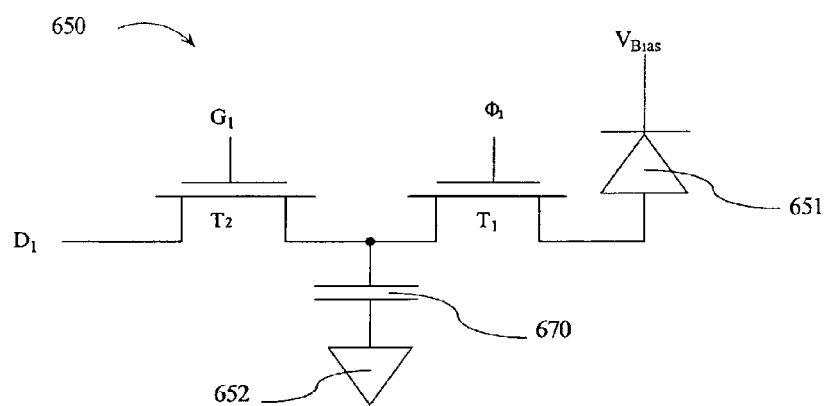
FIG. 3 is an exemplary detailed schematic diagram of pixel circuitry used in the input device in FIG. 2.

FIG. 3 is a schematic diagram of an exemplary pixel circuitry 650 used in the imaging system 1000 of FIG. 1. The pixel circuitry 650 includes two transistors $T_1$ and $T_2$, a capacitor 670, a gate line $G_1$ and a control signal $\phi_1$. Moreover, the pixel circuitry 650 includes a diode 651 and a ground 652.

Referring to FIG. 3, when a signal $V_{bias}$ is received from the control electronics 602, the signal $V_{bias}$ is passed through the diode 651 and input into the source of the transistor $T_1$. The control signal $\phi_1$ controls the signal or the charge of the signal that is stored in the capacitor 670. When the control signal $\phi$ controls the signal or charge to be stored in the capacitor 670, the signal is sent from the drain of the transistor $T_1$ to the capacitor 670, where the signal is stored as a charged signal. Then gate line $G_1$ can be controlled to read out the stored signal from the capacitor 670 in order to deliver the signal, to the receive electronics via line $D_1$. The gate controls conductance of a channel between the source and the drain. An input signal voltage is generally applied to the gate. When the gate line $G_1$ is activated, the charged signal stored in the capacitor 670 is sent to the source of the transistor $T_2$ through the gate and then through the drain of the transistor $T_2$ to the diode through the data line $D_1$. A copy of this circuit exists for each pixel on the imager. For a two-dimensional array, the line D1 is shared among all pixels in the same column, and the gate line $G_1$ is shared among all pixels in the same row.

As previously discussed, a problem associated with the pixel circuitry 650 shown in FIG. 3 is that the pixel circuitry 650 is unable to permit a dynamic response time when an object is moving while being scanned by the imaging system 1000. This problem can occur because the single capacitor 670 will store the cumulative intensity of the rapidly changing image.

Figure 4:
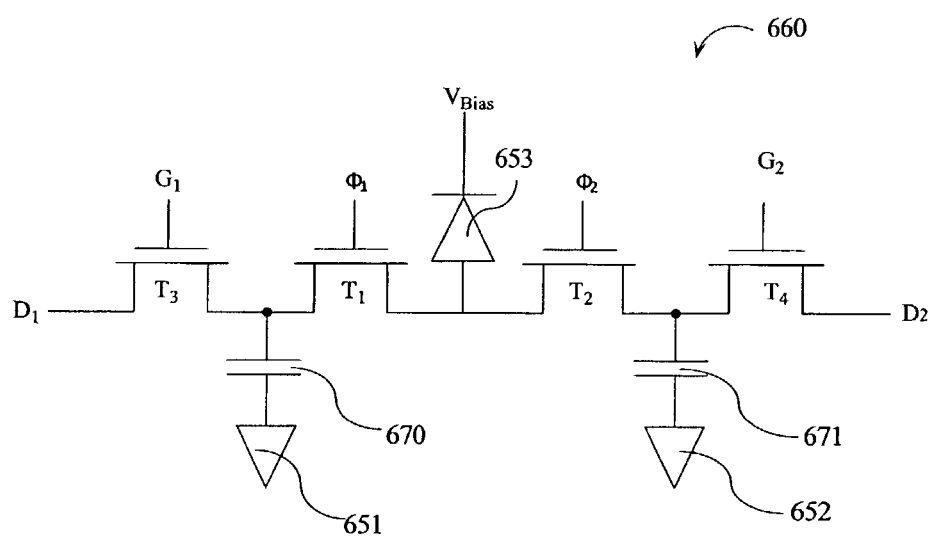
FIG. 4 is a detailed schematic diagram of an exemplary pixel circuitry that can be used with the systems and methods according to an embodiment of this invention.

Accordingly, FIG. 4 is a schematic diagram of an exemplary pixel circuitry 660 that can be used with the systems and methods according to an embodiment of this invention to eliminate the above-mentioned problem. In FIG. 4, the pixel circuitry 660 includes four transistors $T_1$–$T_4$, two capacitors 670–671, two gate lines $G_1$, $G_2$ and two control signals $\phi_1$ and $\phi_2$. Furthermore, the pixel circuitry 660 includes grounds 651–652 and a photodiode 653.

It should be appreciated that the transistors T can be semiconductors, PN junctions, semiconductor diodes or triodes, PNP and NPN transistors, field-effect transistors (FET), insulated-gate field-effect transistors (IGFET), junction field-effect transistors (JFET), metal-oxide-semiconductor (MOSFET), thin-film transistors (TFT), or any electronic device used, for example, as an amplifier or switch. Furthermore, integrated circuits (IC) can be used instead of transistors within the pixel circuitry 650.

The capacitors can be air, silicon oxide, silicon nitride, silicon oxy-nitride, quartz, polyamide, mica, paper, plastic film, chip, tantalum, disk, electrolytic or ceramic type capacitors that function to store an electric charge.

The amplifiers can be any device that increases the amplitude of the signal, and can be any class or operation.

In the pixel circuitry 660 in FIG. 4, when a signal received from the photodiode 653. Then, the signal is sent to one of the two capacitors 670–671 through either transistor $T_1$–$T_2$. The signal is controlled to be stored in one of the capacitors 670–671 by the control signals $\phi_1$–$\phi_2$ when either control signal $\phi_1$–$\phi_2$ controls the respective transistors $T_1$–$T_2$ to send the signal to the respective capacitor 670–671. The control signals $\phi_1$–$\phi_2$ can be synchronized, for example, with red or green illumination of the transmitter 400, or any other characteristics of the transmitter. Then, gate lines $G_1$–$G_2$ control either transistor $T_3$–$T_4$ to read out the stored charge of each respective capacitor 670–671 in order to send the signal to either diode line $D_1$–$D_2$.

In other words, by configuring the pixel circuitry 660 to connect the dual pixel circuitries to the same sensor 653, during a determined time frame, the signal can be directed to either of the two capacitors 670–671 by switching on either the first transistor $T_1$ or the second transistor $T_2$. The dual pixel circuitry configuration solves the problems that occur when a rapidly moving object is imaged in the imaging system 1000 shown in FIG. 1 by adequately being able to store the rapidly varying image.

In various exemplary embodiments according to the invention, either capacitor 670,671 can be independently active for a short period of time as compared to other capacitor which can allow "snap shot" imaging of a rapidly changing object. For example, the capacitor 670 could be independently active for greater than 10 microseconds, with capacitor 671 active for the remainder of the frame time.

Another application of this configuration relates to the behavior of certain photodiodes. The depletion depth, or sensitive region, of a photodiode depends on the bias voltage applied. Various two-terminal devices have been demonstrated which control color sensitivity by adjusting the bias voltage. Examples of these devices are disclosed in "IImproved Concept for Nipiin and Piiin Color Sensitive Two-Terminal Devices with High Linearity," Knipp, D., Stiebig, H., F ö Isch, J., Carius, R., and Wagner, H., Mat. Res. Soc. Proc. 467 (1997) 931, which is hereby incorporated by reference. Amplifiers in the receive electronics 604 which reset the capacitors 670–671 to different voltages after readout allow the color sensitivity of the photodiode can be controlled at speeds faster than the frame time.

Figure 5:
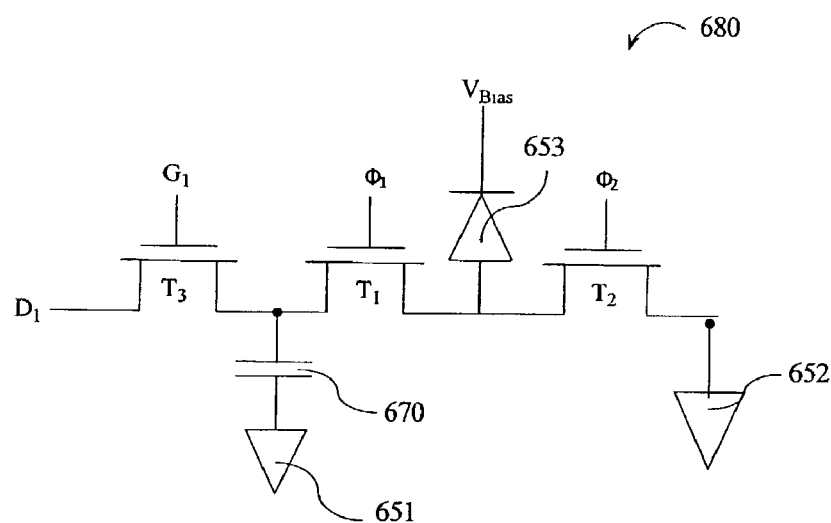
FIG. 5 is a detailed schematic diagram of a second exemplary pixel circuitry for recording only one phase usable with the systems and methods according to another embodiment of this invention.

FIG. 5 is a schematic diagram of a second exemplary pixel circuitry 680 usable with the systems and methods according to another embodiment of this invention. In the pixel circuitry 680 of FIG. 5, only one capacitor 670 and grounds 651–652 are used in conjunction with the transistors $T_1$–$T_3$, photodiode 653 and control signals $\phi_1$–$\phi_2$. This configuration can be used as an alternative pixel circuitry for recording only one phase of $\phi_1$ or $\phi_2$. By adding only a third transistor (shown as $T_2$) and by using only the ground 652 and no additional capacitor (instead of four transistors and an two capacitors), the pixel circuitry 680 can operate as an image enabler to activate the image in order to eliminate leakage from occurring through the diode line $D_1$. For example, the configuration of the pixel circuitry 680 can allow the sensor in the receiver 602 to be blind during one phase of $\phi_1$ and $\phi_2$, and then activated by reversing the phase. As previous discussed, leakage can occur in the convention pixel circuitries. Leakage adds charge to the signal, requiring corrections to be applied before the image is displayed. Furthermore, leakage can also add noise to the image. One application of the image enabler would be to prevent leakage current from combining with the signal charge when the image is expected to be present only during a small fraction of the frame time.

When the signal from the photodiode 653 is input into the pixel circuitry 680, the signal is either controlled by the control signal $\phi_1$ to be stored in the capacitor 670 or controlled by control signal $\phi_2$ to be blind using the common ground 652. When the control signal $\phi_1$ controls the signal or charge to be stored in the capacitor 670, the signal is sent from the drain of the transistor $T_1$ to the capacitor 670 where the signal is stored as a charged signal. However, when control signal $\phi_2$ controls the signal from photodiode 653 to be blind, the signal is not sent to the capacitor 670, and is instead grounded via the common ground 652. Thus, the sensor of the receiver 602 is blind during one phase. Thus, the pixel circuitry 680 configuration according to this embodiment can significantly reduce leakage that can occur through the capacitor 670 to the diode line $D_1$ by using the common ground 652 to blind the receiver 602 at determined phases.

Referring to FIG. 5, the stored signal in the capacitor 670 is subsequently read out when the gate line $G_1$ is controlled to read out the stored signal from the capacitor 670 in order to deliver the signal, for example, to the diode via line $D_1$. As with the embodiment in FIG. 4, when the gate line $G_1$ is activated, the charged signal stored in the capacitor 670 is sent to the source of the transistor $T_3$ through the gate and then through the drain of the transistor $T_3$ to the diode through the readout line $D_1$ where the signal can displayed to represent the object that has been imaged.

Figure 6:
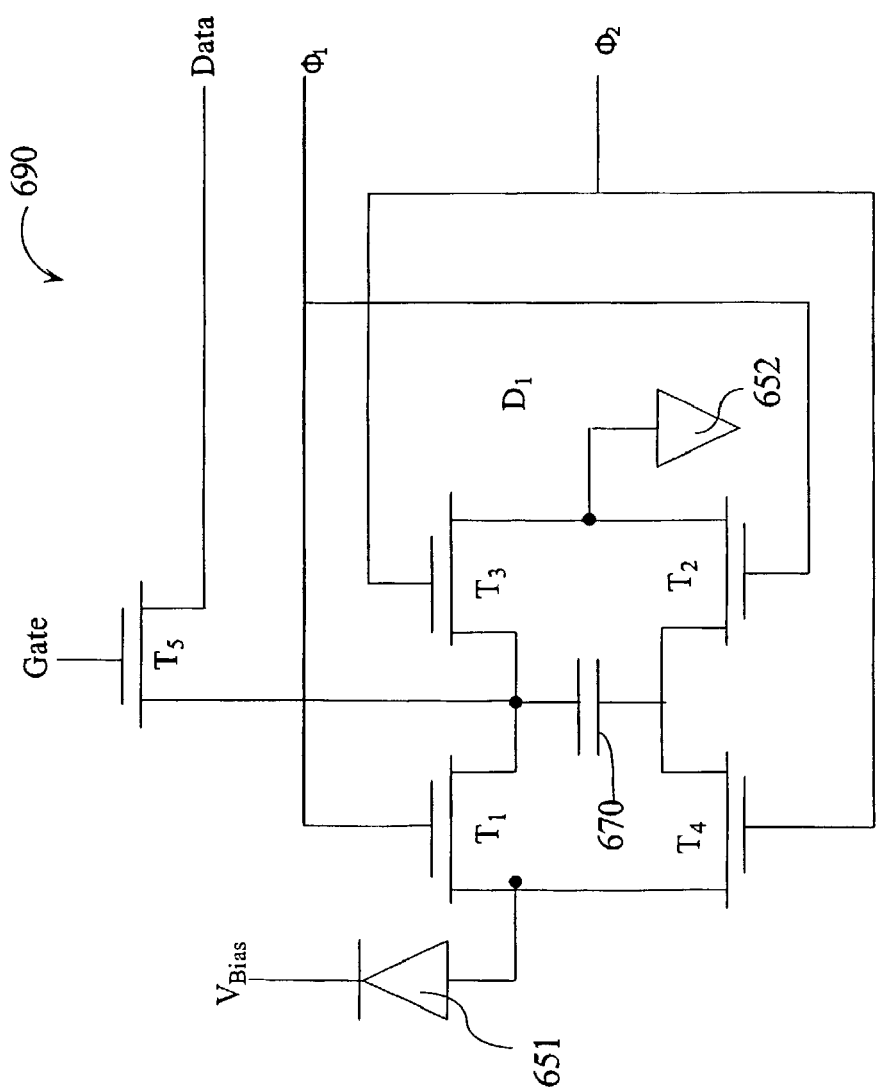
FIG. 6 is a schematic diagram of a third exemplary pixel circuitry that can be used with the systems and methods according to another embodiment of this invention.

FIG. 6 shows a schematic diagram of a third exemplary pixel circuitry 690 that can be used for the systems and methods according to another embodiment of this invention. During some imaging, the imaging system 1000 will not require entire images in order to provide an output. Instead, the imaging system 1000 only requires differences in the entire images to provide an adequate output. With the pixel circuitry 690 in FIG. 6, the circuitry is used to obtain the differences in images and includes one capacitor 670, a photodiode 651, five transistors $T_1$–$T_5$, a ground 652 and control signals $\phi_1$–$\phi_2$.

Figure 7:
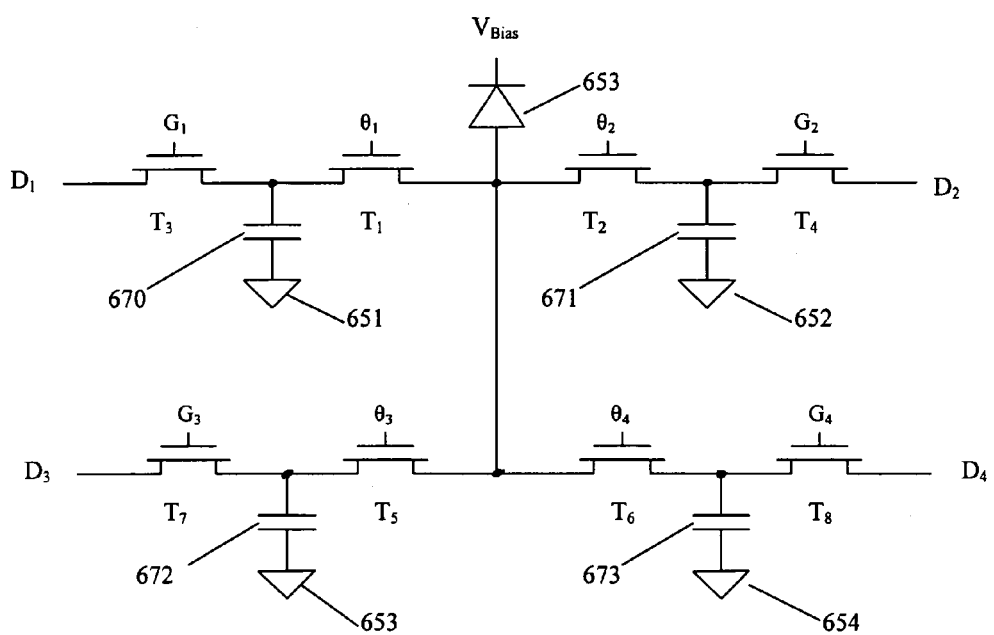
FIG. 7 is a schematic diagram of a fourth exemplary pixel circuitry that can be used with the systems and methods according to another embodiment of this invention.

When the signal is received from the photodiode 651, the signal is then controlled by control signals $\phi_1$ or $\phi_2$ so that the charge from the sensor 653 is either added to the storage capacitor 670 when control signal $\phi_1$ is high or control signal $\phi_2$ is low, or subtracted from the capacitor 670 when control signal $\phi_1$ is low and control signal $\phi_2$ is high. Then the transistor $T_5$ is switched on while the control signal $\phi_1$ is high and control signal $\phi_2$ is low in order to read out the storage capacitor 670, and then transistor $T_5$ is switched off while the control signal $\phi_1$ is low and control signal $\phi_2$ is high. This pixel circuitry 690 can be used where at least one difference is required between two images FIG. 7 shows a schematic diagram of a fourth exemplary pixel circuitry 700 that can be used for the systems and methods according to another embodiment of the invention. With the pixel circuitry 700 in FIG. 7, the circuitry includes four capacitors 670–673 which are connector to a sensor photodiode 653, eight transistors $T_1$–$T_8$, grounds 651–654 and control signals $\phi_1$–$\phi_4$.

When the signal from the photodiode 653 is input into the pixel circuitry 700, the signal is controlled by the control signals $\phi_1$ to be stored in capacitor 670, $\phi_2$ to be stored in capacitor 671, $\phi_3$ to be stored in capacitor 672 or $\phi_4$ to be stored in capacitor 673. Control signals $\phi_1$–$\phi_4$ control respective transistors $T_1$, $T_2$, $T_5$ and $T_6$. Then, gate lines $G_1$–$G_4$ control transistors $T_3$, $T_4$, $T_7$ and $T_6$ respectively to read out the stored charge of each respective capacitor 670–673 in order to send the signal to any of diode lines $D_1$–$D_4$.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, at a combination and configuration, including more or less of a single element, or also within the spirit and scope of the invention

What is claimed is:

1. An imaging system, comprising:
    an output device including a two-dimensional array of pixels;
    an illumination device including two illuminators, each illuminator capable of illuminating an object with a different color; and
    an input device that includes a plurality of pixel devices, each pixel device including:
        a multi-color sensor that provides a first electronic signal representing the object illuminated by one of the two illuminators and a second electronic signal representing the object illuminated by the other of the two illuminators;
        at least one transistor connected to the sensor;
        a first capacitor that is selectively connected to the sensor;
        a second capacitor that is selectively connected to the sensor; and
        a controller that selectively stores the entirety of the first electronic signal in the first capacitor and stores the entirety of the second electronic signal in the second capacitor;
    wherein each pixel device corresponds to a respective pixel in the two dimensional array of pixels.

2. The imaging system according to claim 1, the pixel device further comprising:
    a plurality of transistors and at least two control signals, one of the at least two control signals controlling one of the plurality of transistors so that the first electronic signal is stored in the first capacitor, and the other one of the at least two control signals controlling another one of the plurality of transistors so that the second electronic signal is stored in the second capacitor.

3. The imaging system according to claim 2, wherein the first capacitor is independently active for greater than 10 microseconds.

4. An imaging system, comprising:
   an output device including a two-dimensional array of pixels;
   an illumination device including two illuminators, each illuminator capable of illuminating an object with a different color; and
   an input device that includes a plurality of pixel devices, each pixel device including:
      a multi-color sensor that provides a first electronic signal representing the object illuminated by one of the two illuminators and a second electronic signal representing the object illuminated by the other of the two illuminators;
      at least one transistor connected to the sensor;
      a first capacitor that is selectively connected to the sensor;
      a second capacitor that is selectively connected to the sensor; and
      a controller that:
         controls the electronic signal that represents a multi-color image provided by the sensor; and
         selectively stores the entirety of the first electronic signal the first capacitor and stores the entirety of the second electronic signal in the second capacitor.

* * * * *